United States Patent [19]

Cone

[11] 4,343,510
[45] Aug. 10, 1982

[54] CHILD CAR SEAT AND RESTRAINING SYSTEM

[75] Inventor: Richard E. Cone, Dayton, Ohio

[73] Assignee: Questor Corporation, Toledo, Ohio

[21] Appl. No.: 135,933

[22] Filed: Mar. 31, 1980

[51] Int. Cl.³ .................. A47C 31/00; B60R 21/10
[52] U.S. Cl. .................................. 297/250; 297/216;
297/484; 297/488
[58] Field of Search ............. 297/250, 254, 255, 256,
297/216, 488, 487, 484, 467, 486, 377, DIG. 2;
280/808, 730, 733, 743, 748, 751, 802; 244/122
R, 122 B

[56] References Cited

U.S. PATENT DOCUMENTS

| | | | |
|---|---|---|---|
| 3,762,768 | 10/1973 | Hyde et al. | 297/488 X |
| 3,929,349 | 12/1975 | Schubert | 297/488 X |
| 3,948,556 | 4/1976 | Hyde et al. | 297/488 X |
| 3,992,056 | 11/1976 | Koziatek et al. | 297/454 |
| 4,033,622 | 5/1977 | Boudreau | 297/310 X |
| 4,040,664 | 8/1977 | Tanaka et al. | 297/484 |
| 4,047,755 | 9/1977 | McDonald et al. | 297/464 |
| 4,082,350 | 4/1978 | Tomforde | 297/488 X |
| 4,164,357 | 8/1979 | Conachey | 297/484 X |
| 4,186,962 | 2/1980 | Meeker | 297/216 |

FOREIGN PATENT DOCUMENTS 2008375 9/1970 Fed. Rep. of Germany ...... 297/487
2623102 12/1976 Fed. Rep. of Germany ...... 297/250

Primary Examiner—James T. McCall
Attorney, Agent, or Firm—John E. Benoit; Donald R. Bahr

[57] ABSTRACT

A restraining apparatus for a child's car seat is provided which includes a U-shaped member pivotally mounted at its terminal ends to the opposite sides of the upper portion of the frame of the seat so as to be movable between positions above the occupant and in front of the occupant, said U-shaped member having a padded shield mounted about the bight thereof. A harness having two shoulder straps and a crotch strap is joined together at one of the ends of each strap. A plurality of slots in the back of the seat structure accepts the shoulder straps which pass through and forward of the seat structure. A slot is provided in the seat structure through which the other end of the crotch strap passes, and means are provided on the underside of the shield of adjustably retaining the other ends of the shoulder straps and for providing a releasable latching means for securing the other end of the crotch strap to said underside of the said shield.

11 Claims, 12 Drawing Figures

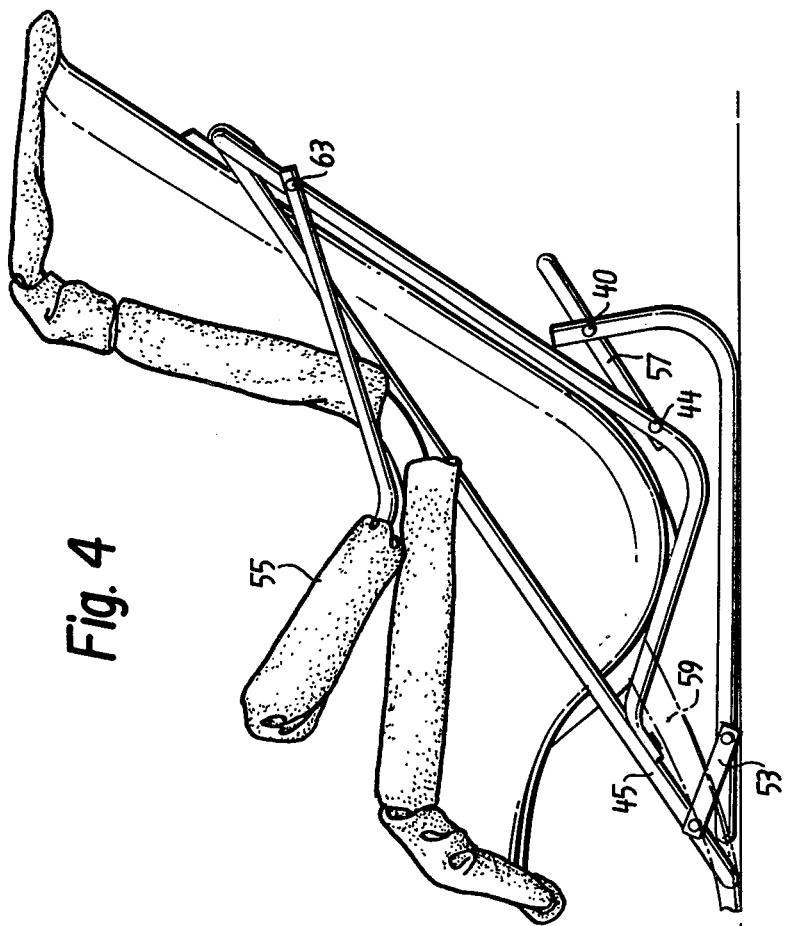
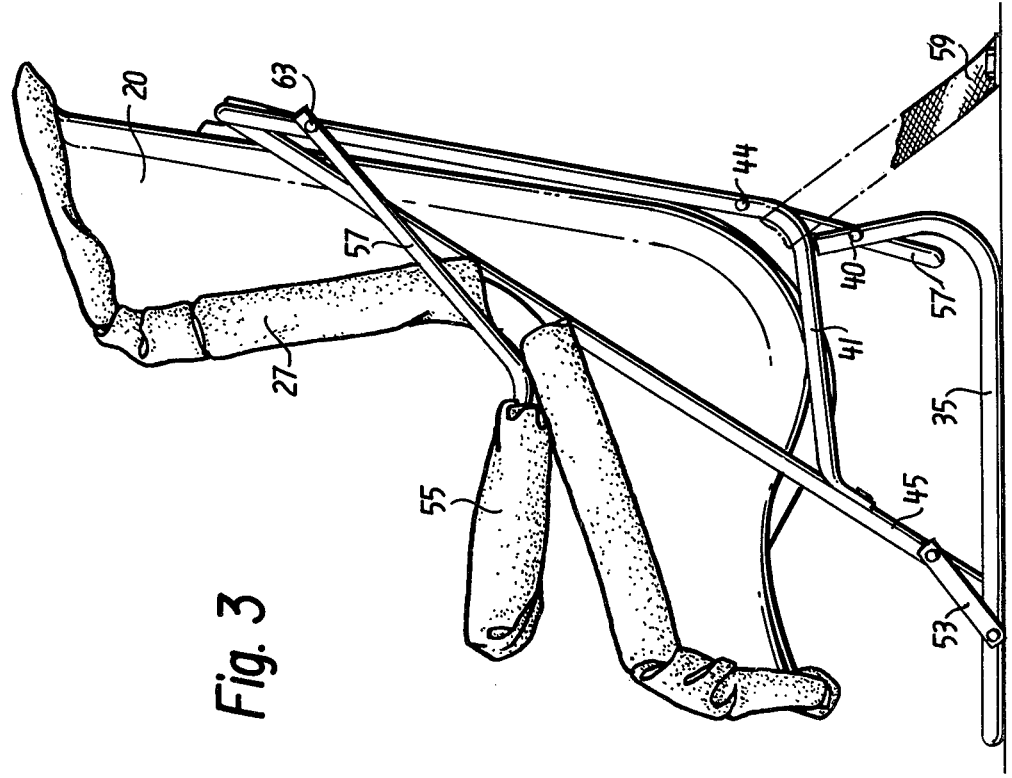

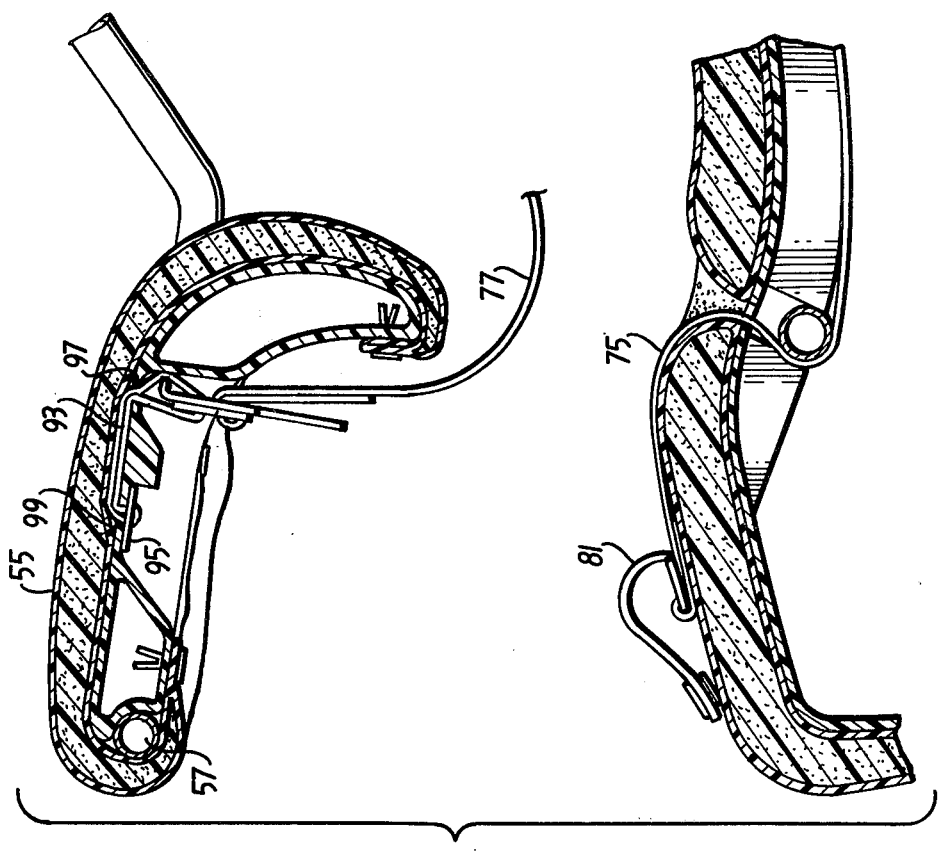
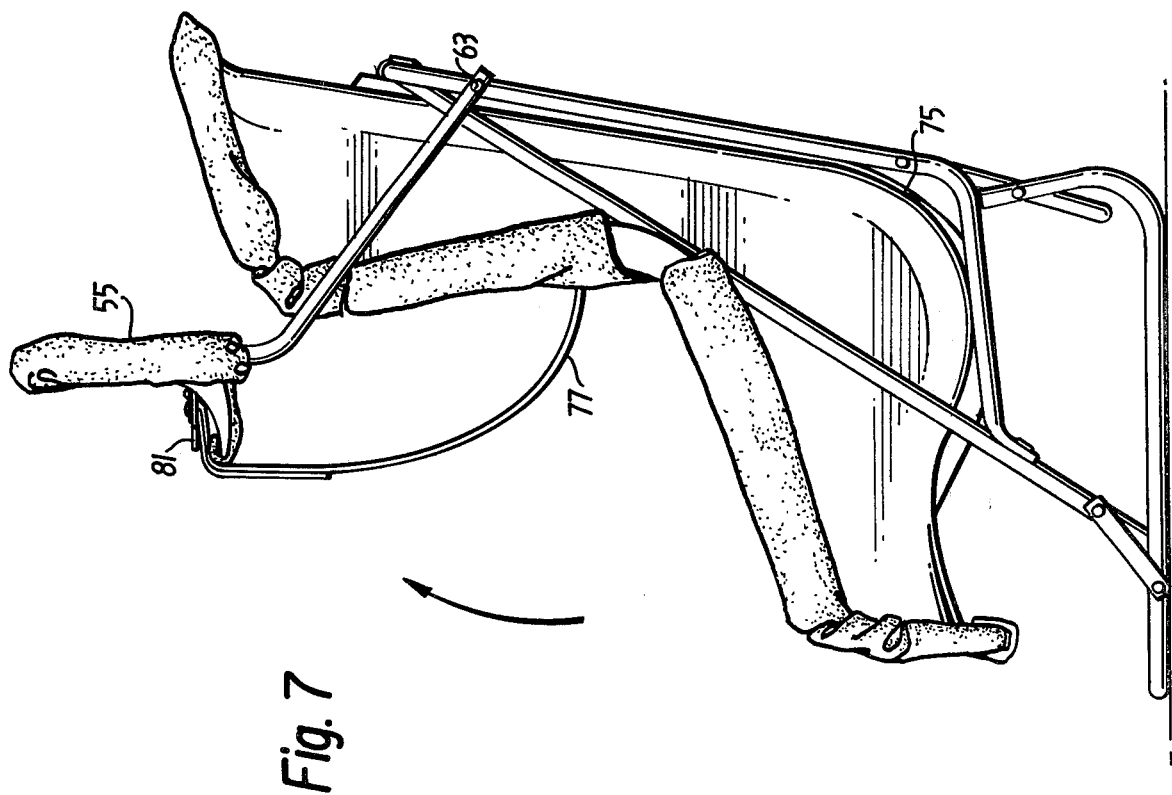

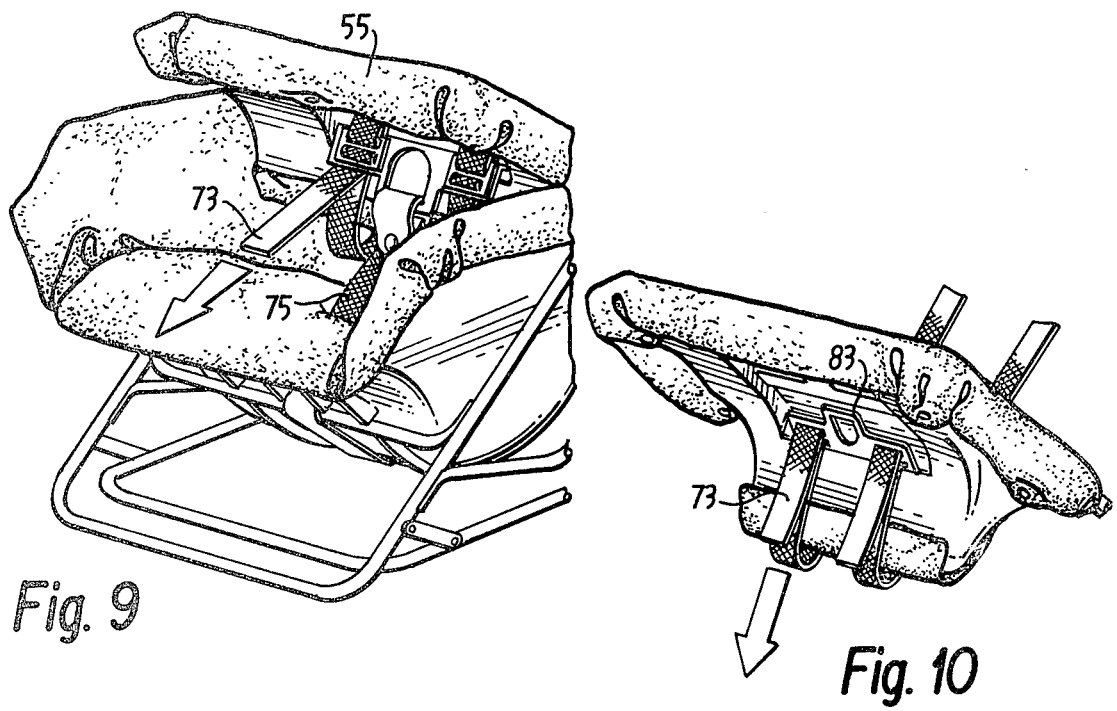
Fig. 9
Fig. 10
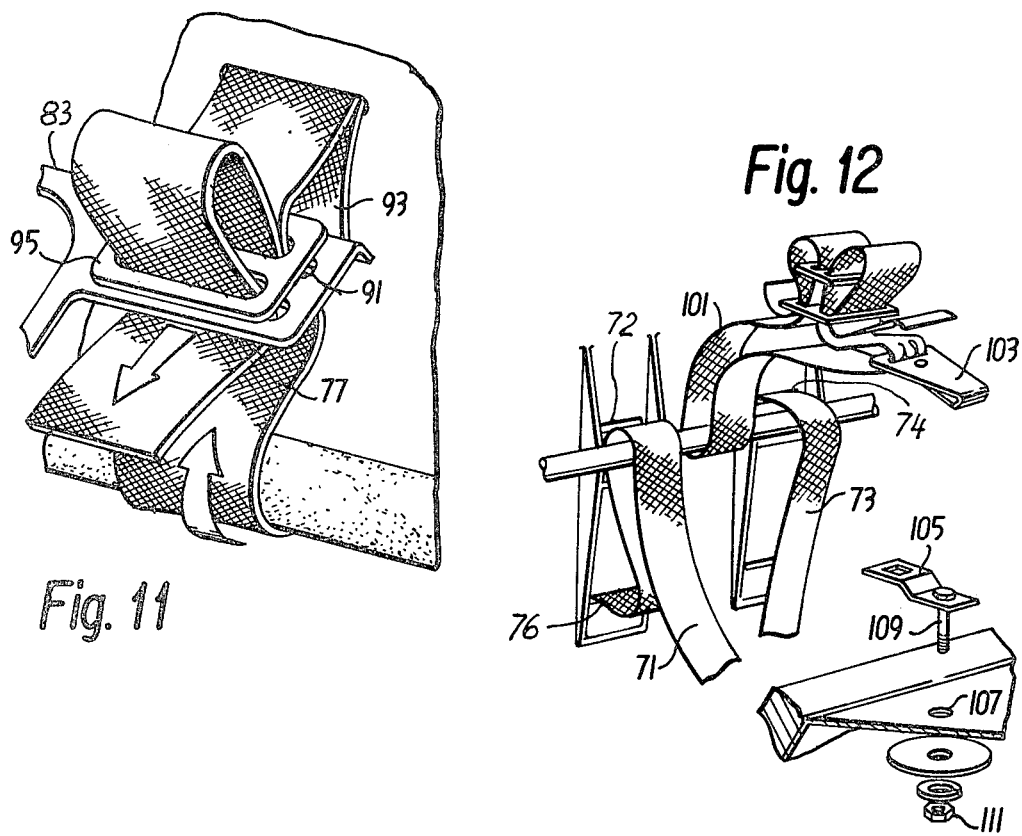
Fig. 11
Fig. 12

CHILD CAR SEAT AND RESTRAINING SYSTEM

This application relates to child's car seat and more particularly to an improvement in the restraining system which is used with such a car seat.

BACKGROUND OF THE INVENTION

Since the government has promulgated very strict regulations governing the type of car seat which may be made commercially available, a great deal of development has occurred in this area. Not only has the development related to the basic car seat structure and support, but also to the particular restraining systems which are used in cooperation with the car seats. One such restraining system relates to a five point harness which may be used with a car seat having a basic tubular frame, and which also may be used with a unitary plastic seat which is designed to semi-enclose the child within the seat.

While the above mentioned developments have greatly reduced the risk of injury or death of a child as a result of an automobile accident, there are still some existing problems which relate to the particular movement of the child and the effects of the forces presented by the restraining devices themselves. There may be tendencies for the child to slip within the harness in one direction or the other. Further, there may be a tendency of the harness to rope or twist so as to present, in effect, a cutting edge against the child. Additionally, the child must be restrained in the crotch area in order to prevent him from slipping downwardly and forward in the direction of his knees and legs.

Yet another problem which exists relative to child car seats is the provision of some kind of impact shield which may absorb the motion of the child as he is pitched forward as the result of an accident.

Yet another problem inherent with harnesses used with various car seats is the diffuculty in properly adjusting the harness so that forces will be applied equally across the shoulders. If too many adjustments are required, it is the tendency of the adult who is responsible for such adjustments to become lax in determining that all of the various straps are equally and positively adjusted. This may be even more true when adjustments are required for various sizes of children, particularly as the child grows.

Additionally, it is quite clear that an infant child is much safer when he is secured in a car seat when the seat is facing in the rearward direction. It is often difficult to provide a car seat that will adequately harness and protect a small child when he is placed in a rearward position, and still provide a car seat that accomodates itself to the increasing size of the child as he attains a size when he is normally placed in a car seat in a forward facing direction.

Accordingly, it is an object of this invention to provide a car seat with an easily adjustable restraining system.

A further object of this invention is to provide a car seat including shoulder harness, crotch strap and impact shield means which effectively operate as one unit.

A still further object of this invention is to provide a car seat having a harness which may be adjustable for varying sizes of the occupant child.

Yet a further object of this invention is to provide a harness system for use with a child's car seat which prevents the harness from twisting and roping wherein the child may be harmed.

Another object of this invention is to provide a harness for use in a car seat in either a forward facing or a rearward facing direction and which may be used in either case with the standard auto lap belt.

Yet another object of this invention is to provide a harness and an impact shield which is easily released in a single unlatching operation.

A still further object of this invention is to provide a harness and a car seat which includes a buckle which is easily releasable, but is out of reach of the child occupant.

A still further object of the invention is to provide a restraining apparatus which is easily adjustable.

Another object of the invention is to provide a restraining system including a harness for a child's car seat wherein the hardware, including the buckle, does not come into contact with the child.

These and other objects of the invention will become apparent from the following description taken in conjunction with the drawings.

BRIEF DESCRIPTION OF THE DRAWINGS

FIG. 3 is a side elevational view of the seat of FIG. 1;

FIG. 4 is a side elevational view of the seat of FIG. 1 shown in a reclining position;

FIG. 7 is a side elevational view of the chair as shown in FIG. 3 with the impact shield in the raised position;

FIG. 8 is a partial sectional view of the impact shield and seat showing the harness connections;

FIG. 9 is a partial perspective view showing the means for removing the harness structure of the present invention from the impact shield;

FIG. 11 is a detailed showing of the securing mechanism for the harness strap; and FIG. 12 is an exploded view showing the adjustable features of the harness structure of the present invention and the anchor strap which may be used therewith.

BRIEF DESCRIPTION OF THE INVENTION

Figure 2:
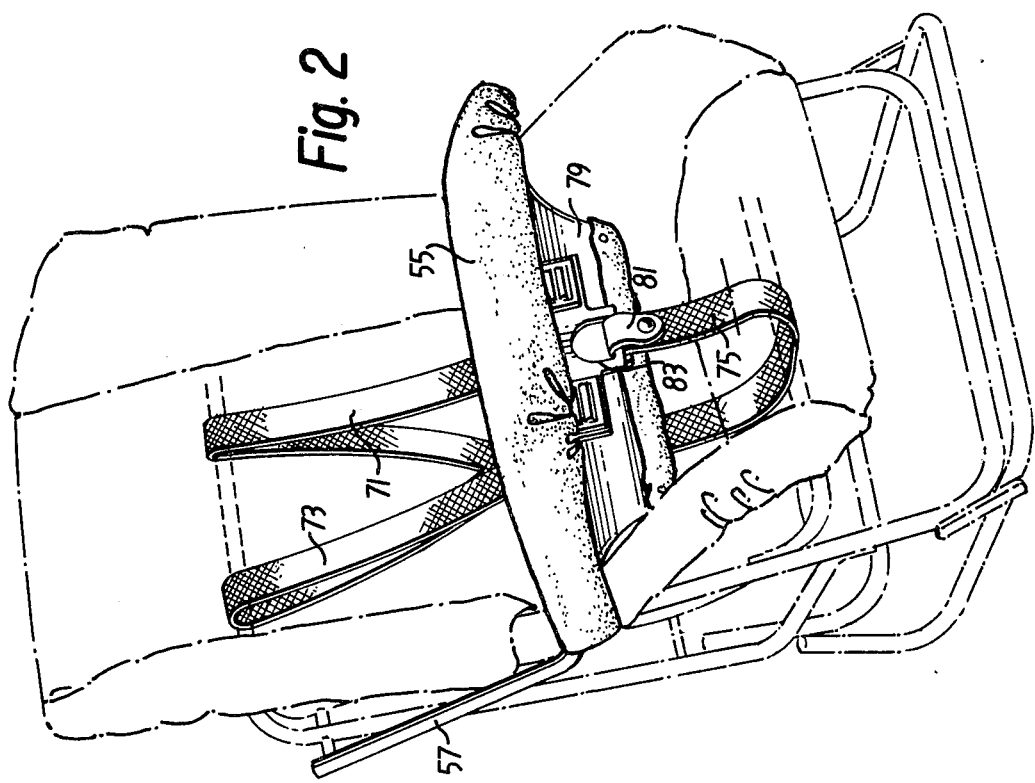
FIG. 2 is a perspective view of the seat of FIG. 1 shown in phantom line with the restraining system of the invention shown in solid line.

The present invention provides a restraining apparatus for a child's car seat which includes a U-shaped member pivotally mounted at its terminal ends to the opposite sides of the upper portion of the frame of the seat so as to be moveable between positions above the occupant and in front of the occupant, said U-shaped member having a padded shield mounted about the bight thereof. A harness having two shoulder straps and a crotch strap is joined together at one of the ends of each strap. A plurality of slots in the back of the seat structure accepts the shoulder straps which pass through and forward of the seat structure. A slot is provided in the seat structure through which the other end of the crotch strap passes, and means are provided on the underside of the shield for adjustably retaining the other ends of the shoulder straps and for providing a releasable latching means for securing the other end of the crotch strap to said underside of the said shield.

DETAILED DESCRIPTION OF A PREFERRED EMBODIMENT OF THE INVENTION

Turning now more specifically to the drawings, there is shown generally in FIGS. 1 through 4, the shell-type chair and frame of the present invention together with the specific restraining structure which is the basis of the present invention. The chair and frame structure shown primarily in FIG. 1 include a shell structure having mounted thereon a padded back 21 and padded seat 23. Side padding 25 and 27 is also mounted on the flanges of the shell which extends on either side of the child. Additional padding 29 and 31 is placed about the flange which extends on either side of the legs of the child when he is within the car seat.

U-shaped frame 35 extends substantially parallel to the underside of the seat so as to provide the basic support for the seat, and includes upwardly extending terminal ends. U-shaped cross-piece 37 is pivotally connected to the upwardly extending ends of base 35 by means of pivot pins 39 and 40. Cross-piece 37 is pivotally connected at its terminal ends to back frame 41 by means of pins 43 and 44. U-shaped back frame 41 extends upwardly behind the seat so as to give a primary back support therefore. Back frame 41 is held in place at its upper end by molded bracket structure 42 as is more clearly seen from FIG. 5. U-shaped back frame 41 is pivotally mounted to the upper terminal ends of U-shaped base 37 by means of pivot pins 43 and 44. A further U-shaped side frame 45 extends at its bight portion below the seat and upwardly on either side of the seat and is connected to the upper part of back frame 41 by pivot pins 61 and 63. Back frame 41 is secured at its lower end to side frame 45 by means of rivets or the like. At its lower end, side frame 45 is connected to U-shaped base frame 35 by means of hinge straps 51 and 53. For structural integrity, there is also provided a cross brace 49 between the sides of back frame 41 above pivots 43 and 44.

FIG. 3 illustrates the seat in an upright forward facing position while FIG. 4 illustrates the seat as used in a rearward facing reclined position. In either case, the auto lap belt 59 is secured as shown so as to maintain the seat firmly in place on the auto seat.

Figure 1:
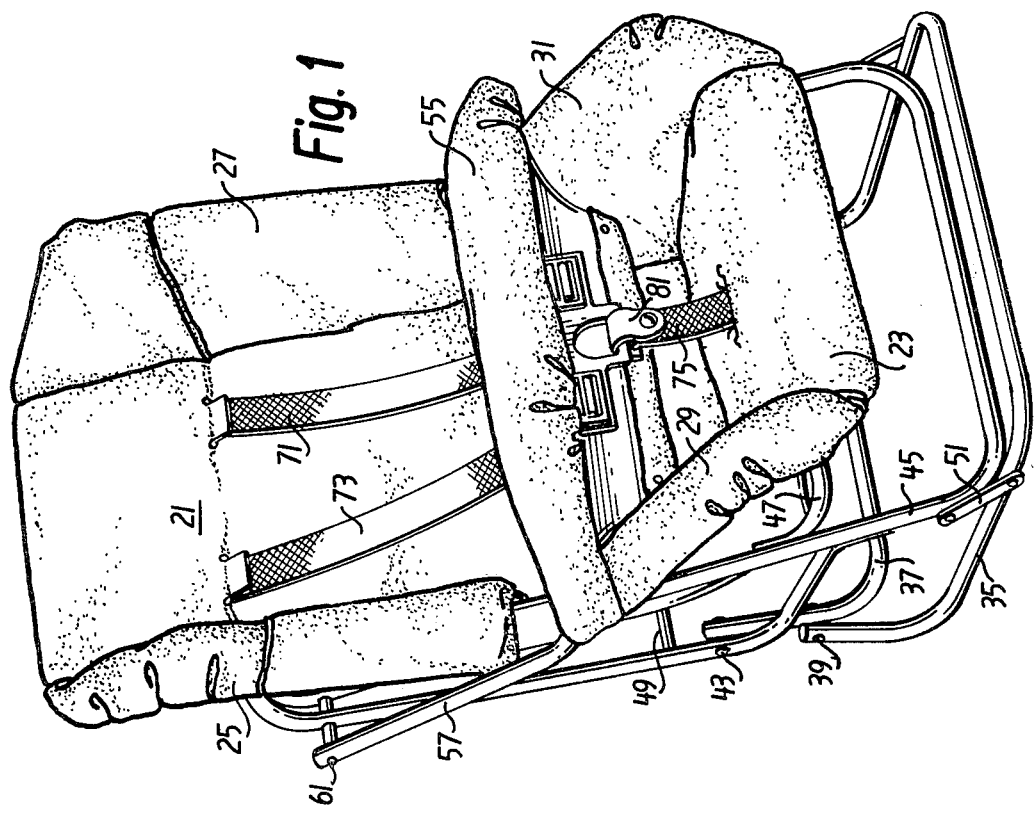
FIG. 1 is a perspective view of a preferred embodiment of the car seat of the present invention.

An impact shield 55 is mounted on U-shaped shield rod 57 which is in turn secured at either end to back frame 41 by pivot pins 61 and 63 whereby impact shield 55 may rest in a position shown in FIGS. 1 and 2 and may be moved upwardly until it is extended above the head of the occupant. It is important to know that, although the impact shield is shown resting on the side panels of the seat itself, as the child grows, it may be free to move upwardly to a position which accomodates itself to the size of the child before it is secured in place.

As is more clearly seen in FIG. 2, the restraining apparatus of the present invention includes shoulder harness strap 71 and shoulder harness strap 73 and crotch strap 75 together with shield 55 and rod 57. Referring to the illustration in FIG. 5, one of the ends of each of the shoulder harness straps is secured together by means of stitching 77 which also secures one end of crotch strap 75 with the entire stitch structure being rearward of the back of the seat.

The other end of crotch strap 75 terminates in crotch strap buckle 81 which is secured to metal plate 83 by means which will become more apparent as the description proceeds. Buckle 81 is of a solid curved structure so as to pass through aperture 85 in metal plate 83. This type of buckle is well known in the art and is available for use with various other structures.

Figure 6:
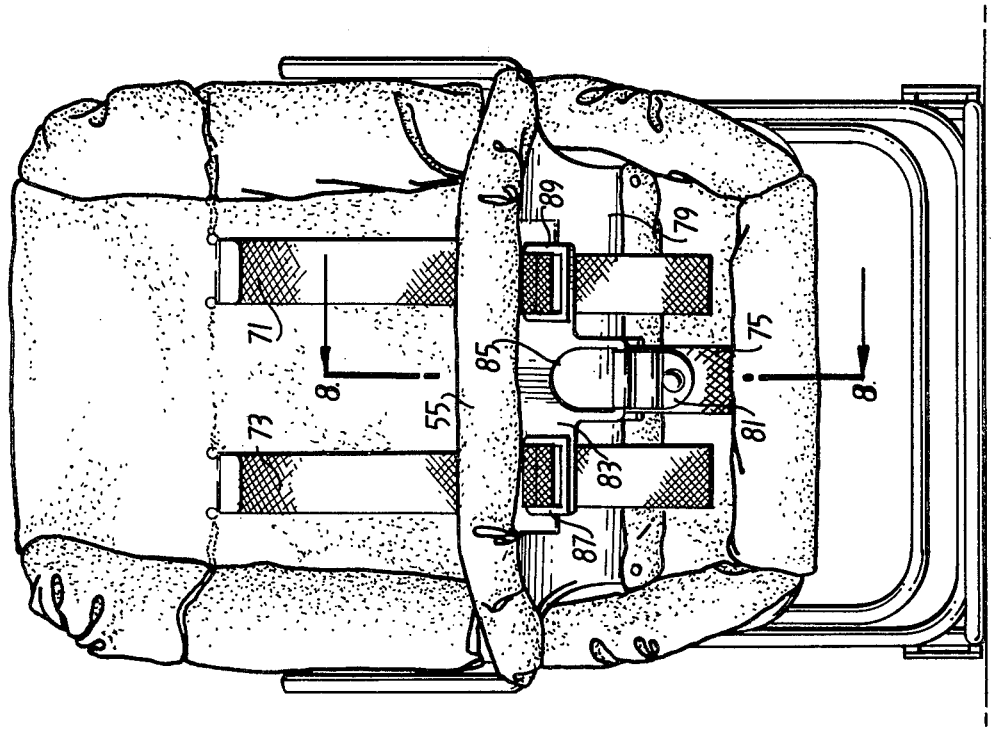
FIG. 6 is a front view of the seat of FIG. 1.
Figure 5:
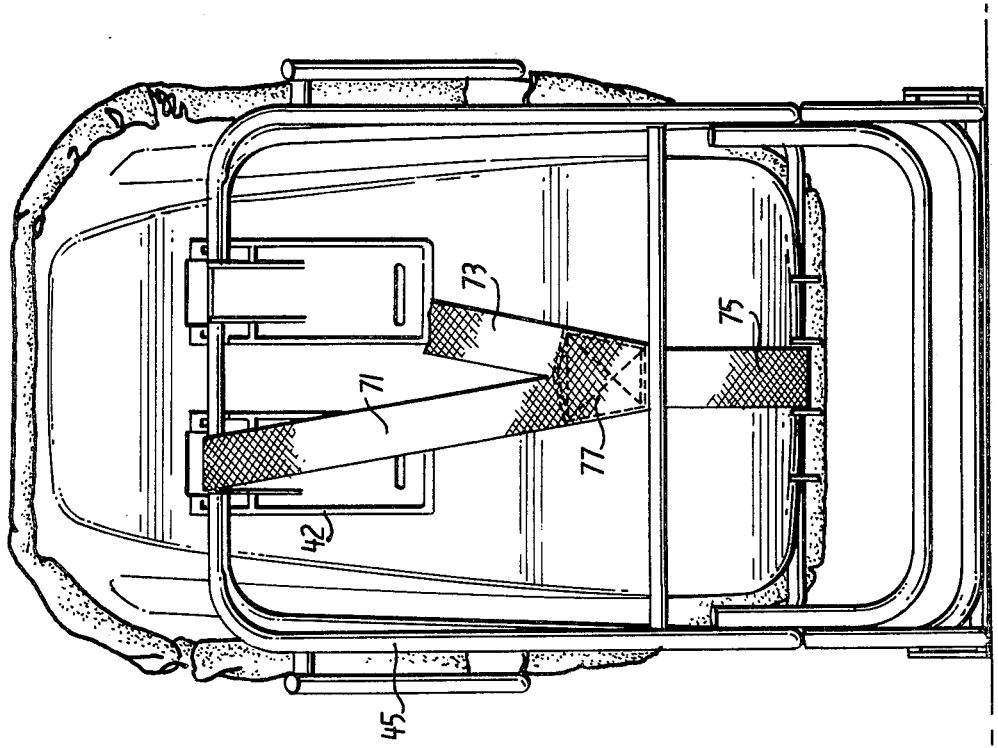
FIG. 5 is a rear view of the seat of FIG. 1.

Harness straps 71 and 73 pass through selected slots, which in the case of FIGS. 5 and 6 are slots 72, 74 (FIG. 12) which extend through the back of the seat and the padding on the back of seat. The terminal ends of straps 71 and 73 extend downwardly, forward of the seat and underneath padded shield 55 and are adjustably secured to plate 83 by means of strap adjusters 87 and 89 which are adjacent apertures 91 in plate 83. This structure is shown in more detail in FIG. 11.

FIG. 6 also shows in more detail the position of crotch strap buckle 81 when it is secured through aperture 85 in the center of the plate 83. The buckle may be released by lifting up on the lower lip thereof and passing the buckle through the aperture 85 so that crotch strap 75 drops free.

Turning to FIGS. 9, 10 and 11, there is presented an illustration of the means for adjusting the restraining device which includes the straps and the impact shield. After the child is placed in the seat and impact shield 75 is lowered into position, the ends of the shoulder straps may be pulled in the direction of the arrow until they are properly secured across the shoulders of the child occupant. As will be evident, it is very easy to adjust the straps so that pressure is substantially equally distributed across opposite shoulders of the child. This adjustment is made after crotch strap 75 is secured within aperture 85. FIG. 10 shows a means for adjusting the shoulder strap in the reverse direction after the crotch strap has been removed. This is also the means whereby the shoulder harnesses are removed from the plate 83 so that they may be changed relative to the size of the child by using other selective slots through the back of the seat. In order to adjust the straps in this direction, or to remove them from plate 83, plate 83 is lifted upwardly so as to allow the straps to be removed therefrom.

As can be seen from FIG. 11, plate 83 is secured to the underside of the impact shield by means of strap 93 on either side thereof. This structure is shown more clearly in the sectional view of FIG. 8 wherein strap 93 is a continuous loop, one end thereof which passes through the plate structure and the strap adjusters and the other end which passes through anchor plate 95 which is also on the underside of the impact shield. This restraining means allows plate 83 to be moved in the direction as shown in FIG. 10 to allow strap adjustment.

FIG. 12 shows the positions which the shoulder straps 71 and 73 may assume. When the seat is in the forward facing position, it is designed to be used with the child of a weight of over 35 pounds. Thus, the strap passes through the upper slot in the back of the seat and allows for more room to place the child in the seat. FIG. 12 is only illustrative since, in any situation, both shoulder straps would be placed through the same slot. When the seat is to be used in the rearward facing, and usually reclining position, the straps are placed through lower slots 76 as is shown by strap 71.

Additionally, it is required that the back of the seat be firmly anchored in some fashion. This is illustrated by loop strap 101 which is also controlled as to length by strap adjusters and passes through a slot in strap hook 103. This is a standard strap hook with a spring type release. If the seat is to be used in the front seat of an automobile, this strap hook is connected to the female member of one of the lap belts in the rear seat of the auto. However, if the seat is placed in the rear seat of an automobile, anchor 105 is secured to the rear filler panel by means of bolt 109 passing through drill hole 107 in the panel and may be secured by means of a nut 111 or the like.

As can now be seen, the present invention clearly provides the advantages and objectives listed hereinabove. The restraint system is effectively one system containing the shield, the restraint harness, webbing and buckle. The ease with which it may be operated is obvious and the protection provided to the child occupant meets the required standards. Further, none of the metal hardware is in contact with the child so that no damage could occur either by a sudden bruising or by the metal parts being heated by the sun before the child is placed in the seat. Additionally, although the buckle is very easy to snap and unsnap, it is out of the reach of the child occupant by being placed well beneath the shield. The shield itself is so designed that it is gently curved in the proper places so that there are no hard surfaces, edges or corners.

The seat operates very efficiently upon impact created by an accident. The child's head moves forward and rides down under the control of the harness. If the head is moved down to an extreme point, it will contact the soft shield. The shield is made of a sufficient size so that if the child's head contacts it, the full portion of his face and head will contact the entire surface. Preferably, the shield itself will be padded with high density urethane or other energy absorbing material. It is further noted that the seat of the present invention is particularly designed as a multiple position child restraint system that is adjustable and is designed for use of a child from a small size to approximately 50 pounds. As pointed out above, it is preferably used in its reclined position in a rearwardly facing position for a child in the range from 17 to 35 pounds. Above 35 pounds, it is normally used in its upright position and in a forward facing direction. Thus, the economy of the seat is extended over a period of the child's growth which is normally not available with other car seats.

The above description and drawings are illustrative only since various components could be substituted without departing from the scope of the invention which is to be limited only by the following claims.

I claim:

1. In a child's car seat including an adjustable frame and a unitary seat and back structure, an improved restraining apparatus comprising
   a U-shaped member pivotally mounted at its terminal ends to opposite sides of the upper portion of said frame so as to be movable between positions above the occupant and in front of the occupant;
   a padded shield mounted about the bight of said U-shaped member;
   at least one pair of opposed slots in the back of said seat structure;
   a shoulder harness strap extending through each of said slots, said straps being secured together at one of their ends behind said back of said seat structure;
   means secured to the underside of said shield for adjustably retaining the other ends of said shoulder harness straps, said straps passing under the inner edge of said shield;
   a crotch strap secured at one end thereof to said one end of said shoulder straps;
   a slot in said seat structure, said crotch strap passing under said seat structure and upwardly through said slot in said seat structure; and
   releasable latching means for securing the other end of said crotch strap to said underside of said shield.

2. The car seat of claim 1 further comprising
   a second pair of opposed slots substantially vertically aligned with said one pair of said opposed slots in the back of said seat structure wherein said shoulder harness straps may be selectively inserted in said slots to accomodate different size occupants.

3. The car seat of claim 1 wherein
   said means for adjustably retaining the other ends of said strap comprises
   a plate movably secured to the underside of said shield;
   slots in opposed ends of said plate for accepting said straps and strap adjusters adjacent said slots in said opposed ends of said plate.

4. The apparatus of claim 3 wherein said releasable latching means comprises
   an aperture in said plate; and
   a curved plate secured to said other end of said crotch strap for hooking into said aperture in said plate.

5. The car seat of claim 1 wherein said frame is adjustable between an upright position and a reclined position.

6. The car seat of claim 1 wherein said adjustable frame is of a structure whereby an auto lap belt may pass therethrough when the seat is in either a forward facing or rearward facing direction.

7. In a child's car seat including an adjustable frame and a unitary seat and back structure, an improved restraining apparatus comprising
   a U-shaped member pivotally mounted at its terminal ends to opposite sides of the upper portion of said frame so as to be movable between positions above the occupant and in front of the occupant;
   a padded shield mounted about the bight of said U-shaped member;
   a harness having two shoulder straps and a crotch strap joined together at one of the ends of each of said straps;
   a plurality of slots in said back structure, the other ends of each of said shoulder straps passing through preselected individual slots and forward of the back of said seat;
   a slot in said seat structure, the other end of said crotch strap passing under the seat structure and upwardly through said slot in said seat structure;
   means secured to the underside of said shield for adjustably retaining the other ends of said shoulder straps, said straps passing under the inner edge of said shield; and
   releasable latching means for securing the other end of said crotch strap to said underside of said shield.

8. The car seat of claim 7 wherein
   said means for adjustably retaining the other ends of said shoulder straps comprises
   a plate movably secured to the underside of said shield;
   slots in opposed ends of said plate for accepting said straps; and
   strap adjusters adjacent said slots in said opposed ends of said plate.

9. The apparatus of claim 8 wherein said releasable latching means comprises
   an aperture in said plate; and a curved plate secured to said other end of said crotch strap for hooking into said aperture.

10. The car seat of claim 7 wherein said car seat is adjustable between an upright position and a reclined position.

11. The car seat of claim 7 wherein said adjustable frame is of a structure whereby an auto lap belt may pass therethrough when the seat is in either a forward facing or rearward facing direction.

* * * * *